(12) United States Patent
Hata et al.

(10) Patent No.: US 9,664,338 B2
(45) Date of Patent: May 30, 2017

(54) METHOD FOR CONSTRUCTING LOW-TEMPERATURE TANK AND LOW-TEMPERATURE TANK

(71) Applicants:Moriki Hata, Tokyo (JP); Juichiro Yamada, Tokyo (JP); Michitaka Furikoma, Tokyo (JP); Masahiko Sugitani, Tokyo (JP)

(72) Inventors: Moriki Hata, Tokyo (JP); Juichiro Yamada, Tokyo (JP); Michitaka Furikoma, Tokyo (JP); Masahiko Sugitani, Tokyo (JP)

(73) Assignee: IHI CORPORATION (JP)

( * ) Notice: Subject to any disclaimer, the term of this patent is extended or adjusted under 35 U.S.C. 154(b) by 163 days.

(21) Appl. No.: 14/108,862

(22) Filed: Dec. 17, 2013

(65) Prior Publication Data

US 2014/0103046 A1    Apr. 17, 2014

Related U.S. Application Data

(63) Continuation of application No. PCT/JP2012/065914, filed on Jun. 21, 2012.

(30) Foreign Application Priority Data

Jun. 27, 2011    (JP) ................................ 2011-142092

(51) Int. Cl.
*F17C 3/00* (2006.01)
*F17C 3/02* (2006.01)
(Continued)

(52) U.S. Cl.
CPC .............. *F17C 3/025* (2013.01); *E04H 7/02* (2013.01); *F17C 7/04* (2013.01); *B65D 88/022* (2013.01);
(Continued)

(58) Field of Classification Search
CPC .... B65D 88/022; B65D 88/027; B65D 88/76; Y10T 29/49904
(Continued)

(56) References Cited

U.S. PATENT DOCUMENTS 442,298 A * 12/1890 Wiselogel ................ B01J 8/009
34/166
2,600,015 A * 6/1952 McLaughlin ................ 220/88.1
(Continued)

FOREIGN PATENT DOCUMENTS

CN    1603642 A    4/2005
CN    1922434 A    2/2007
(Continued)

OTHER PUBLICATIONS

JP Office Action dated Sep. 24, 2014 corresponding to 2013-522806 (4 pages).
(Continued)

*Primary Examiner* — Sarang Afzali
(74) *Attorney, Agent, or Firm* — Ostrolenk Faber LLP

(57) ABSTRACT

When manufacturing a low-temperature tank (1), a plurality of unit tanks (10) that are able to be connected together by mutually different objects, and that are each capable of storing low-temperature liquefied gas are manufactured in a factory that is distant from a construction site. The unit tanks (10) are then transported to the construction site, and an inner tank (2) is then assembled at the construction site by connecting together the plurality of unit tanks (10). An outer tank (3) is then formed around the inner tank (2).

8 Claims, 5 Drawing Sheets

(51) Int. Cl.
  *E04H 7/02* (2006.01)
  *F17C 7/04* (2006.01)
  *B65D 88/02* (2006.01)
  *B65D 88/76* (2006.01)
(52) U.S. Cl.
  CPC ............ *B65D 88/027* (2013.01); *B65D 88/76* (2013.01); *F17C 2201/0157* (2013.01); *F17C 2201/0166* (2013.01); *F17C 2201/0171* (2013.01); *F17C 2201/052* (2013.01); *F17C 2203/0604* (2013.01); *F17C 2203/0629* (2013.01); *F17C 2209/22* (2013.01); *F17C 2209/232* (2013.01); *F17C 2221/033* (2013.01); *F17C 2223/0161* (2013.01); *F17C 2270/0134* (2013.01); *Y10T 29/49826* (2015.01); *Y10T 29/49904* (2015.01)
(58) Field of Classification Search
  USPC ......... 52/79.9, 169.7, 741.12, 741.3, 745.01, 52/745.02
  See application file for complete search history.

(56) References Cited

U.S. PATENT DOCUMENTS

| | | | | |
|---|---|---|---|---|
| 2,810,265 | A * | 10/1957 | Beckwith | B63B 25/16 114/74 A |
| 3,145,680 | A * | 8/1964 | Farkas | F17C 1/002 114/74 A |
| 3,537,416 | A * | 11/1970 | Cowles | 114/74 A |
| 3,688,938 | A * | 9/1972 | Yamamoto et al. | 220/560.08 |
| 3,766,583 | A * | 10/1973 | Phelps | 405/203 |
| 3,828,708 | A * | 8/1974 | Gerwick et al. | 114/65 A |
| 3,830,180 | A * | 8/1974 | Bolton | 114/74 A |
| 3,882,591 | A | 5/1975 | Yamamoto | 29/455 |
| 3,886,753 | A * | 6/1975 | Birdy et al. | 405/207 |
| 4,083,318 | A * | 4/1978 | Verolme | 114/74 A |
| 4,116,150 | A | 9/1978 | McCown | 114/74 A |
| 4,183,221 | A * | 1/1980 | Yamamoto | 62/53.1 |
| 4,275,679 | A * | 6/1981 | Finsterwalder | 114/264 |
| 4,331,252 | A * | 5/1982 | Carren et al. | 220/4.17 |
| 4,374,478 | A * | 2/1983 | Secord et al. | 73/863.31 |
| 4,826,644 | A * | 5/1989 | Lindquist et al. | 264/71 |
| 4,963,082 | A * | 10/1990 | Lindquist et al. | 425/117 |
| 5,398,839 | A * | 3/1995 | Kleyn | 220/560.03 |
| 5,454,408 | A * | 10/1995 | DiBella | F04B 9/1176 141/18 |
| 5,486,554 | A * | 1/1996 | Truax | C08L 95/00 523/324 |
| 5,493,832 | A | 2/1996 | Abrams | |
| 5,495,695 | A * | 3/1996 | Elliott, Jr. | 52/20 |
| 5,577,630 | A * | 11/1996 | Blair et al. | 220/581 |
| 5,778,608 | A * | 7/1998 | Elliott, Jr. | 52/79.9 |
| 5,833,390 | A * | 11/1998 | Lovett | 405/52 |
| 6,095,367 | A * | 8/2000 | Blair et al. | 220/581 |
| 6,202,707 | B1 * | 3/2001 | Woodall | F17C 7/02 141/1 |
| 6,227,396 | B1 * | 5/2001 | Small | 220/4.12 |
| 6,491,054 | B1 * | 12/2002 | Small | 137/15.09 |
| 6,786,166 | B1 * | 9/2004 | Marchand et al. | 114/74 R |
| 7,159,738 | B2 * | 1/2007 | Luongo | 220/586 |
| 7,219,682 | B2 * | 5/2007 | Agnew | F17C 13/084 137/1 |
| 7,856,998 | B2 * | 12/2010 | Bauer | 137/15.16 |
| 8,020,722 | B2 * | 9/2011 | Richards et al. | 220/584 |
| 8,231,316 | B2 * | 7/2012 | Ness | 410/46 |
| 8,250,863 | B2 * | 8/2012 | Bollinger | F02C 6/16 60/508 |
| 8,281,820 | B2 * | 10/2012 | White | F17C 5/02 141/37 |
| 8,506,219 | B2 * | 8/2013 | Ness | 410/46 |
| 8,607,830 | B2 * | 12/2013 | White | F17C 5/02 141/11 |
| 8,763,390 | B2 * | 7/2014 | Bollinger | F02C 6/16 60/511 |
| 8,833,582 | B1 * | 9/2014 | Ellis et al. | 220/23.4 |
| 8,870,501 | B2 * | 10/2014 | Ness | 410/46 |
| 8,899,279 | B2 * | 12/2014 | Safronovs | F04B 9/1253 141/198 |
| 9,090,393 | B2 * | 7/2015 | Ellis et al. | |
| 2002/0046773 | A1 * | 4/2002 | Bishop | B63B 25/14 137/259 |
| 2006/0086741 | A1 | 4/2006 | Bacon | 220/560.12 |
| 2007/0194051 | A1 * | 8/2007 | Bakken et al. | 222/173 |
| 2008/0209916 | A1 * | 9/2008 | White | F17C 5/02 62/48.1 |
| 2010/0187192 | A1 * | 7/2010 | Ness | 211/71.01 |
| 2013/0015183 | A1 * | 1/2013 | Fredette et al. | 220/6 |
| 2013/0056111 | A1 * | 3/2013 | White | F17C 5/02 141/5 |
| 2013/0105020 | A1 * | 5/2013 | Ness | 137/899 |
| 2014/0041736 | A1 * | 2/2014 | Ness | 137/376 |
| 2014/0103035 | A1 * | 4/2014 | Fredette et al. | 220/6 |
| 2014/0202585 | A1 * | 7/2014 | Barker | F17C 5/06 141/4 |
| 2015/0001209 | A1 * | 1/2015 | Ellis et al. | 220/23.4 |
| 2015/0001210 | A1 * | 1/2015 | Ellis et al. | 220/23.4 |
| 2015/0001211 | A1 * | 1/2015 | Ellis et al. | 220/23.4 |
| 2015/0203286 | A1 * | 7/2015 | Ness | |

FOREIGN PATENT DOCUMENTS

| | | | |
|---|---|---|---|
| CN | 101059202 A | 10/2007 | |
| EP | 2275361 A1 * | 1/2011 | ............ B65D 90/00 |
| GB | 1 309 330 | 3/1973 | |
| GB | 2080359 A | 2/1982 | |
| JP | 47-044213 | 12/1972 | |
| JP | 49-031074 | 8/1974 | |
| JP | 59-004600 | 1/1984 | |
| JP | 07-269160 | 10/1995 | |
| JP | 2003-240197 | 8/2003 | |
| JP | 2008-503703 | 2/2008 | |
| WO | WO 2005/094243 | 10/2005 | |
| WO | WO 2006/001711 A2 | 1/2006 | |
| WO | WO 2009/049908 A1 | 4/2009 | |

OTHER PUBLICATIONS

International Search Report and Written Opinion mailed Sep. 18, 2012 in corresponding PCT International Application No. PCT/JP2012/065914.

Australian Office Action, dated Apr. 24, 2015, issued in corresponding Australian Patent Application No. 2012276851. Total 5 pages.

Chinese Office Action issued in Chinese Application No. 201280030688.7 dated Feb. 28, 2015 with an English translation of the Search Report only.

* cited by examiner

METHOD FOR CONSTRUCTING LOW-TEMPERATURE TANK AND LOW-TEMPERATURE TANK

This application is a continuation application based on a PCT Patent Application No. PCT/JP2012/065914, filed Jun. 21, 2012, whose priority is claimed on Japanese Patent Application No. 2011-142092, filed Jun. 27, 2011. The contents of both the PCT Application and the Japanese Application are incorporated herein by reference.

FIELD OF THE INVENTION

The present invention relates to a method for constructing a low-temperature tank and a low-temperature tank.

BACKGROUND ART

Currently, a large number of low-temperature tanks that are used to store low-temperature liquefied gas such as LNG (Liquefied Natural Gas) are being constructed. Low-temperature tanks of this type are provided with an inner tank and an outer tank as is shown, for example, in Patent document 1.

The inner tank directly stores a low-temperature liquefied gas. The outer tank is formed so as to surround the inner tank.

When constructing a low-temperature tank of this type, the entire low-temperature tank, including the aforementioned inner tank and outer tank, is manufactured and assembled at a previously determined construction site (i.e., at a construction location).

RELATED ART DOCUMENTS

Patent Documents

[Patent document 1] Japanese Patent Application, First Publication No. S59-4600

DISCLOSURE OF THE INVENTION

Problems to be Solved by the Invention

The construction time and the like required to build a low-temperature tank vary greatly depending on the skill level of the workmen who are constructing the low-temperature tank. Namely, in order to construct a low-temperature tank within a short construction time, a large number of highly skilled workmen are needed.

However, it is common for low-temperature tanks to be constructed simultaneously in a variety of locations, and in actual practice it is not possible to dispatch highly skilled workmen to all of the construction sites. Because of this, it is difficult to shorten the construction time at a construction site.

The present invention was conceived in view of the above-described drawback, and it is an object thereof to shorten the construction time at a construction site when constructing a low-temperature tank.

Means for Solving the Problem

The present invention employs the following structure as a means of solving the above-described drawback.

A first aspect of the present invention is a method for constructing a low-temperature tank in which a low-temperature tank that stores a low-temperature liquefied gas is constructed for a previously determined construction site, and that includes: a unit tank manufacturing step in which a plurality of unit tanks that are able to be connected to each other and that are each capable of storing a low-temperature liquefied gas are manufactured at a factory that is distant from the construction site; a transporting step in which the unit tanks are transported to the construction site; an inner tank assembly step in which an inner tank is assembled at the construction site by connecting together the plurality of unit tanks; and an outer tank manufacturing step in which an outer tank is manufactured around the inner tank.

A second aspect of the present invention is an aspect in which, in the above-described first aspect, wall portions of the unit tanks are provided with a metal membrane, thermal insulating material and a liner in sequence from the low-temperature liquefied gas storage area side of the unit tanks.

A third aspect of the present invention is an aspect in which, in the above-described first or second aspects, in the outer tank manufacturing step, the outer tank, which is formed from concrete, is manufactured by pouring concrete around the inner tank.

A fourth aspect of the present invention is an aspect in which, in any of the above-described first through third aspects, the shape of the unit tanks when seen in plan view is hexagonal.

A fifth aspect of the present invention is an aspect in which, in the above-described first aspect, the plurality of unit tanks are joined together via holes for liquid that are open in a bottom portion of each unit tank and via holes for gas that are open in a top portion of each unit tank.

A sixth aspect of the present invention is an aspect in which, in any of the above-described first through fourth aspects, the unit tanks are assembled in the inner tank assembly step such that a position in the inner tank where the low-temperature liquefied gas is extracted is at the lowest position thereof.

In the above-described sixth aspect, it is also possible for bottom surfaces of the unit tanks that make up the inner tank to be inclined, and for the lowest position of these bottom surfaces to be set as the low-temperature liquefied gas extraction position. Alternatively, it is also possible for bottom surfaces of mutually adjacent unit tanks to become gradually lower in a stepped arrangement, and for the low-temperature liquefied gas extraction position to be formed in the unit tank having the lowest bottom surface.

A seventh aspect of the present invention is a low-temperature tank that stores low-temperature liquefied gas and that includes: an inner tank that is formed by connecting together a plurality of unit tanks; and an outer tank that surrounds the inner tank.

Effects of the Invention

According to the present invention, the inner tank of a low-temperature tank is constructed by connecting together a plurality of unit tanks. These unit tanks are formed at a factory that is distant from the low-temperature tank construction site (i.e., construction location).

Namely, according to the present invention, it is possible for the production of unit tanks that can be used in a variety of construction sites to be concentrated in the factory. Because of this, it is possible to manufacture the unit tanks all together in a batch without any highly-skilled workmen having to travel to the construction site.

In particular, when the inner tank is what is known as a membrane tank, which is provided with a metal membrane, thermal insulating material, and a liner, then a high level of skill is sought after in the workmen who are manufacturing the inner tank. In response to this, according to the present invention, it is possible for workmen having a high level of skill to manufacture at the factory where they have been brought together as a group the inner tanks (i.e., the unit tanks) that are to be transported to various construction sites all together in a batch.

Because of this, according to the present invention, the work carried out at the construction site ends up being only the connecting together of the unit tanks (i.e., the assembling of the inner tanks) and the manufacturing of the outer tank. Accordingly, instances when a high level of skill is needed at the construction site are reduced, and the construction time at the construction site can be shortened.

EMBODIMENTS FOR CARRYING OUT THE INVENTION

Hereinafter, an embodiment of a method for constructing a low-temperature tank, a low-temperature tank, and a unit tank according to the present invention will be described with reference made to the drawings. Note that in the following drawings, the scale of the respective components has been suitably altered in order to make each component a recognizable size.

Figure 1A:
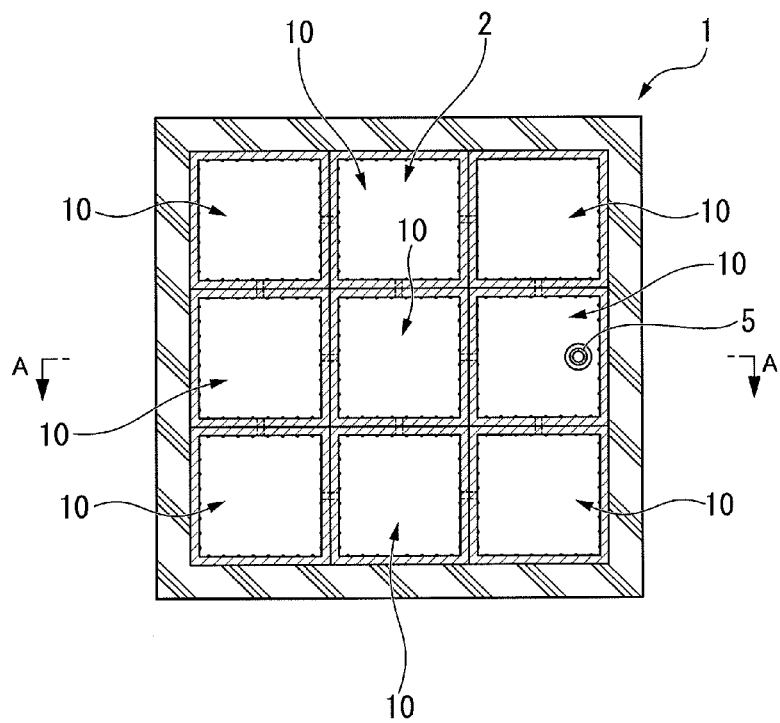
FIG. 1A is a cross-sectional view taken along a horizontal plane showing the schematic structure of a low-temperature tank according to an embodiment of the present invention.
Figure 1B:
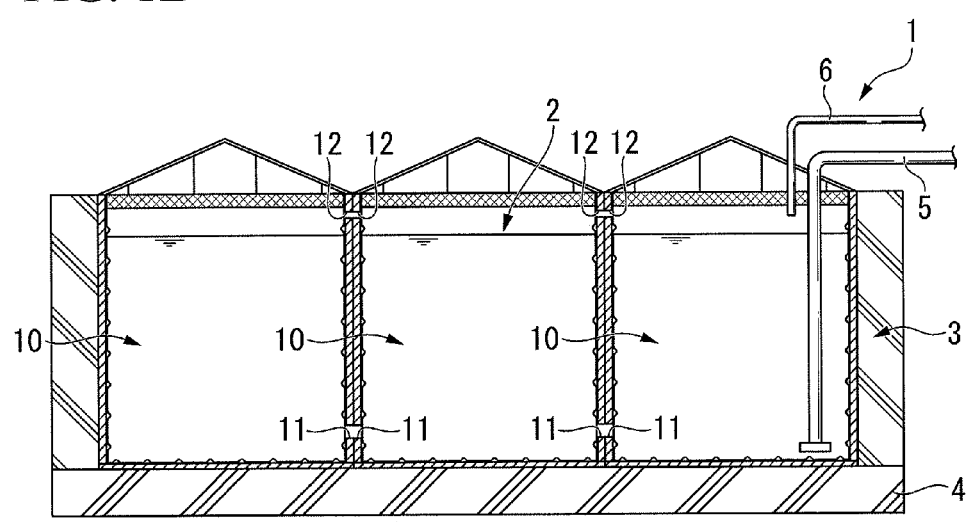
FIG. 1B is a cross-sectional view taken along a line A-A in FIG. 1A.

FIGS. 1A and 1B are cross-sectional views showing the schematic structure of a low-temperature tank 1 according to the present embodiment. Note that FIG. 1A is a cross-sectional view of the low-temperature tank 1 taken along a horizontal plane, while FIG. 1B is a cross-sectional view taken along a line A-A in FIG. 1A.

As is shown in FIGS. 1A and 1B, the low-temperature tank 1 of the present embodiment is provided with an inner tank 2, an outer tank 3, a foundation 4, a pumping apparatus 5, and a BOG recovery apparatus 6.

The inner tank 2 is a container that is used for storing low-temperature liquefied gases such as LNG and the like, and is formed by connecting together a plurality of unit tanks 10.

In the present embodiment, as is shown in FIG. 1A, nine of these unit tanks 10 are placed adjacent to each other so that the shape of the inner tank 2 when seen in plan view is a square shape.

Note that the number of unit tanks 10 that are used to make up the inner tank 2 is not limited to nine, and this number may be set in accordance with the storage volume desired for the inner tank 2.

Figure 2A:
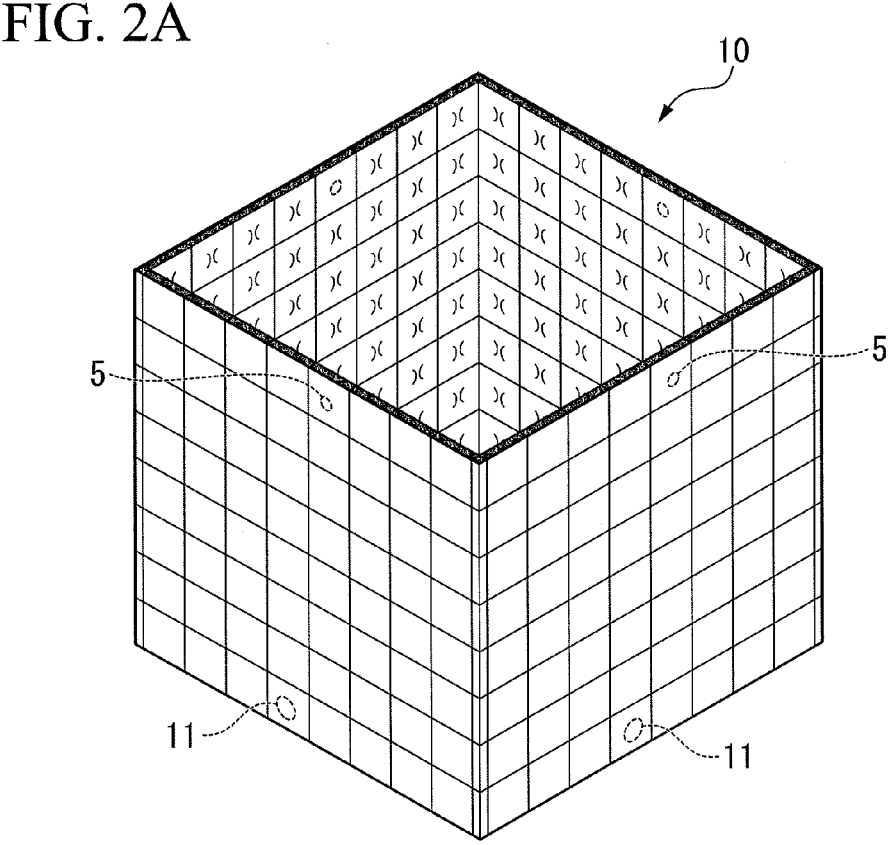
FIG. 2A is a perspective view of a unit tank showing the schematic structure of a unit tank that is provided in the low-temperature tank according to an embodiment of the present invention.
Figure 2B:
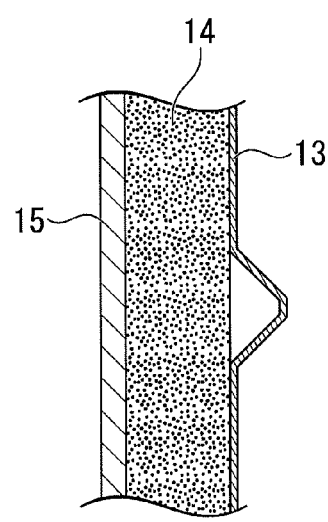
FIG. 2B is a cross-sectional view taken in a vertical direction of the unit tank shown in FIG. 2A.
Figure 2C:
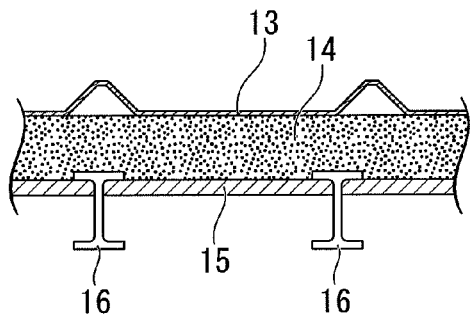
FIG. 2C is a cross-sectional view taken along a horizontal plane of the unit tank shown in FIG. 2A.

FIGS. 2A through 2C are schematic structural views of a unit tank 10. Note that FIG. 2A is a perspective view of the unit tank 10, FIG. 2B is a cross-sectional view running in a vertical direction of a wall portion of the unit tank, and signal 2C is a cross-sectional view taken along a horizontal plane of a wall portion of the unit tank.

The shape of each unit tank 10 is set as a rectangular parallelepiped with a hollow interior. In FIG. 2A, the top portion of the unit tank 10 is open, however, it is also possible to provide a roof portion so that this top portion of the unit tank 10 is closed off.

Holes for liquid 11 that are used for forming connections with adjacent unit tanks 10 are able to be formed in the wall portions of the unit tanks 10. Adjacent unit tanks 10 are connected together by joining mutually facing holes for liquid 11 together.

The holes for liquid 11 are provided in order to enable liquid, namely, LNG to move between mutually adjacent unit tanks 10.

Note that as is shown in FIG. 1B, in addition to the holes for liquid 11, holes for gas 12 are also able to be formed in wall portions of the unit tanks 10. These holes for gas 12 are provided in order to enable gas, namely, BOG (Boil Off Gas) to move between mutually adjacent unit tanks 10.

Mutually adjacent unit tanks 10 are linked together via the holes for liquid 11 that are open in a bottom portion of each unit tank 10, and the holes for gas 12 that are open in a top portion thereof. As a result of this, excellent circulation of liquefied gases and BOG is possible within a plurality of unit tanks 10. Moreover, it is also possible to selectively extract only the liquefied gases that have accumulated in the bottom portion of a unit tank 10 via the holes for liquid 11 that are open in the bottom portion of the unit tank 10 using the pumping apparatus 5, or only the BOG that have accumulated in the top portion of the unit tank 10 via the holes for gas 12 that are open in the top portion of the unit tank 10 using the BOG recovery apparatus 6.

In addition, as is shown in FIG. 2B, a metal membrane 13, thermal insulating material 14, and a liner 15 are provided in the wall portions of each unit tank 10.

The membrane 13 is a rectangular-shaped metal plate that has a corrugation that absorbs heat deformation provided in a central portion thereof, and whose thickness is set to approximately several millimeters. The inner wall surface of each unit tank 10 is formed by arranging a plurality of the membranes 13 in adjacent rows. Stainless steel, for example, is used as the metal for forming the membranes 13.

The thermal insulating material 14 is interposed between the membrane 13 and the liner 15, and suppresses any gasification of the low-temperature liquefied gas by impeding the movement of heat between the interior and exterior of the unit tanks 10. Note that it is not necessary for the thermal insulating material 14 to be provided in all of the wall portions of the unit tanks 10, and the thermal insulating material 14 can be omitted from the wall portion of a unit tank 10 that faces the wall portion of another unit tank 10.

The liner 15 is placed on the outermost side of the wall portion of the unit tanks 10, and functions as a supporting body for the thermal insulating material 14 and membrane 13.

Note that as is shown in FIG. 2C, H-shaped steel beams 16 are provided at fixed intervals in the wall portions of each unit tank 10 so as to serve as rigid components that maintain the shape of the unit tanks 10.

These unit tanks 10 are each formed at a size that enables them to be transported by ship.

For example, in order to make them transportable by ship, the unit tanks 10 may be formed having a width of approximately 25 m and a depth and height of approximately 15 m.

Returning to FIGS. 1A and 1B, the outer tank 3 is formed so as to surround from the outside the inner tank 2 that has been formed by a plurality of unit tanks 10. In the present embodiment, the outer tank 3 is formed from perlite concrete.

The foundation 4 serves as a supporting base to support the inner tank 2 and the outer tank 3, and may be fixed to the installation surface, for example, by a plurality of piles (not shown).

The pumping apparatus 5 is provided in order to pump low-temperature liquefied gas that has been stored in the inner tank 2 to the outside of the inner tank 2 and the outer tank 3, and is connected to one unit tank 10 from among the plurality of unit tanks 10.

Namely, in the present embodiment, the unit tank 10 to which the pumping apparatus 5 is connected forms the extraction position for the low-temperature liquefied gas.

The BOG recovery apparatus 6 is provided in order to recover BOG that has been generated inside the unit tank 2, and is connected to the top portion of the same unit tank 10 as the pumping apparatus 5.

Next, a method of constructing the low-temperature tank 1 of the present embodiment will be described with reference made to the flow chart in FIG. 3.

Figure 3:
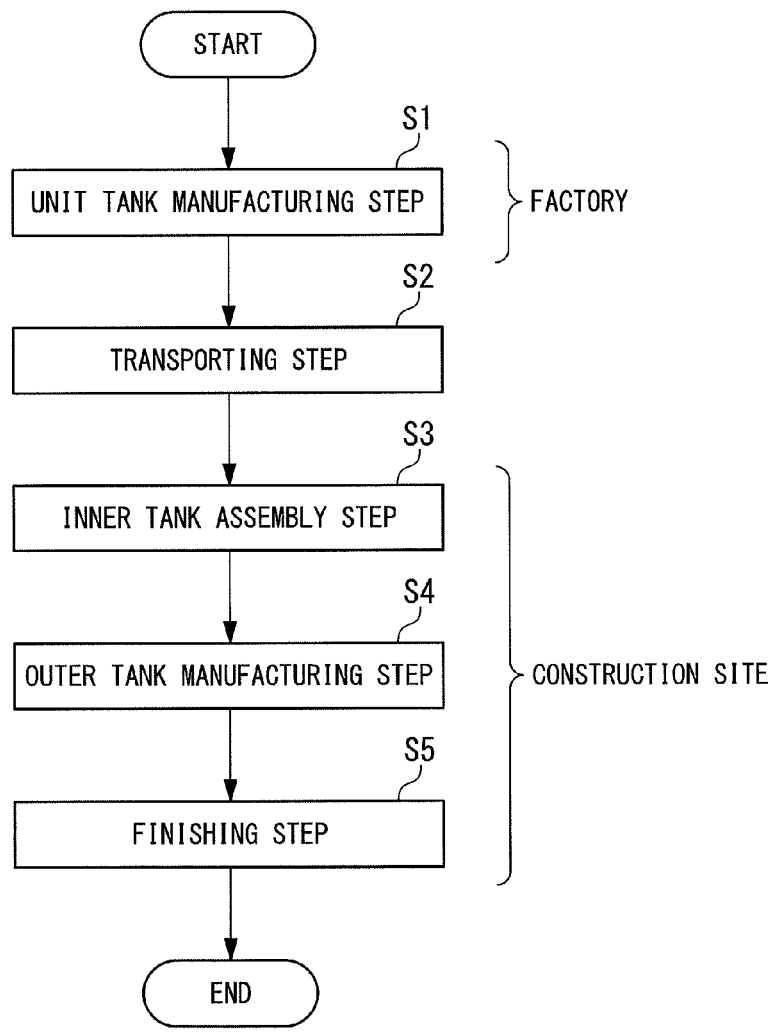
FIG. 3 is a flowchart illustrating a method of constructing a low-temperature tank according to an embodiment of the present invention.

As is shown in FIG. 3, in the method of constructing the low-temperature tank 1 of the present embodiment, a unit tank manufacturing step (step S1), a transporting step (step S2), an inner tank assembly step (step S3), an outer tank manufacturing step (step S4), and a finishing step (step S5) are performed in that sequence.

The unit tank manufacturing step (step S1) is a step in which a plurality of the unit tanks 10 are manufactured in a factory that is distant from the construction site of the low-temperature tank 1.

In the unit tank manufacturing step (step S1), highly skilled workmen manufacture the unit tanks 10 by molding and welding the membrane 13 and welding the H-shaped steel beams 16 and the like.

Moreover, as was described above, the unit tanks 10 that are manufactured in the unit tank manufacturing step (step S1) of the present embodiment are manufactured to a size that enables them to be transported by ship.

In this manner, in the present embodiment, in the unit tank manufacturing step (step S1), unit tanks 10 that are able to be connected together by mutually different objects, and that are each capable of storing low-temperature liquefied gas are manufactured in the factory that is distant from the construction site.

Note that it is preferable for internal scaffolding to be placed inside the unit tank 10 in order to avoid deformation of the unit tank 10 occurs in the subsequent transporting step (step S2), inner tank assembly step (step S3), and outer tank manufacturing step (step S4).

The transporting step (step S2) is a step in which a unit tank 10 that has been manufactured in the unit tank manufacturing step (step S1) is transported to the construction site.

Specifically, either one or a plurality of unit tanks 10 are loaded onto a single ship, and a plurality of the unit tanks 10 are then transported to the construction site by either one or a plurality of ships.

Note that the operation for loading the unit tanks 10 onto a ship and the operation for unloading the unit tanks 10 from the ship may be accomplished by loading the unit tanks 10 onto a supporting base and then lifting up this supporting base.

By lifting up the unit tanks 10 via a supporting base in this manner, no load is applied to the unit tanks 10 so that it is possible to prevent any deformation to the unit tanks 10. Furthermore, it is possible by means of this lifting process to easily load the unit tanks 10 onto a desired position on the ship.

It is also possible for the operation for loading the unit tanks 10 onto a ship and the operation for unloading the unit tanks 10 from the ship to be accomplished by loading the unit tanks 10 onto a dolly and then moving this carriage onto the ship or off the ship.

In this case, the unit tanks can be moved easily simply by pushing or pulling the dolly.

However, in this case, it is necessary for the top surface of the point on the ship where the dolly is loaded to be level with the ground surface on the dockside. To accomplish this, the dolly may be set up on a barge that is dragged or propelled by the ship.

The inner tank assembly step (step S3) is a step in which the inner tank 2 is assembled by connecting together a plurality of the unit tanks 10 at the construction site.

In the inner tank assembly step (step S3), firstly, the foundation 4 which serves as the base of the inner tank 2 is formed. Note that the forming of the foundation 4 may also be performed prior to the inner tank assembly step (step S3).

Next, the hole for liquid 11 and the hole for gas 12 are formed in locations of a particular wall portion of the unit tank 10 that faces the wall portion of another unit tank 10. These unit tanks 10 are then put in position and connected together such that the holes for liquid 11 and the holes for gas 12 are connected to each other. Note that when the placement of each unit tank 10 in the low-temperature tank 1 has already been decided in advance, then it is also possible to form the holes for liquid 11 and the holes for gas 12 in advance at the factory.

The outer tank manufacturing step (step S4) is a step in which the outer tank 3 is formed around the inner tank 2.

In this outer tank manufacturing step (step S4), firstly, the molding box that is to be used when the concrete is poured is formed. Note that this molding box may also be formed prior to the inner tank assembly step (step S3) at the same time as the foundation 4 is formed. In this case, the assembling of the inner tank 2 in the inner tank assembly step (step S3) is performed inside the molding box.

The outer tank 3 is then formed by pouring concrete into the molding box.

The finishing step (step S5) is a step in which the roof portion is formed, the pumping apparatus 5 and the BOG recovery apparatus 6 are installed, and the low-temperature tank 1 is tested.

According to the above-described method of constructing the low-temperature tank 1 of the present embodiment, the inner tank 2 of the low-temperature tank 1 is constructed by connecting together a plurality of unit tanks 10. These unit tanks 10 are manufactured in a factory that is distant from the low-temperature tank 1 construction site.

Namely, according to the method of constructing the low-temperature tank 1 of the present embodiment, it is possible to concentrate in one factory the manufacturing of unit tanks 10 that are used at a variety of construction sites. Because of this, it is possible to manufacture the unit tanks 10 all together in a batch without any highly-skilled workmen having to travel to the construction site.

In particular, as in the low-temperature tank 1 of the present embodiment, when the inner tank 2 is what is known as a membrane tank, which is provided with a metal membrane, thermal insulating material, and a liner, then a high level of skill is sought after in the workmen who are manufacturing the inner tank 2. In response to this, according to the method of constructing the low-temperature tank 1 of the present embodiment, it is possible for workmen having a high level of skill to manufacture at the factory where they have been brought together as a group the inner tanks (i.e., the unit tanks 10) that are to be transported to various construction sites all together in one batch.

According to the method of constructing the low-temperature tank 1 of the present embodiment, the work carried out at the construction site ends up being principally only the connecting together of the unit tanks 10 (i.e., the assembling of the inner tanks) and the manufacturing of the outer tank 3. Accordingly, instances when a high level of skill is needed at the construction site are reduced, and the construction time at the construction site can be shortened.

Note that in the method of constructing the low-temperature tank 1 of the present embodiment, the wall portions of the unit tanks 10 are provided with the metal membrane 13, the thermal insulating material 14, and the liner 15 in that sequence from above-described low-temperature liquefied gas area side.

Because of this, it is not necessary to perform the operation for installing the thermal insulating material 14 and the like at the construction site, so that the construction time at the construction site can be shortened even more.

Moreover, in the method for constructing the low-temperature tank 1 of the present embodiment, in the outer tank manufacturing step (step S4), the outer tank 3, which is formed from concrete, is formed by pouring concrete around the inner tank 2.

Because of this, compared with when the outer tank is manufactured from metal, it is not necessary for the workmen to have a particularly high skill level, and it is possible to shorten the construction time even further.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

For example, in the above-described embodiment, a case is described in which the unit tanks 10 have a rectangular shape when seen in plan view.

Figure 4:
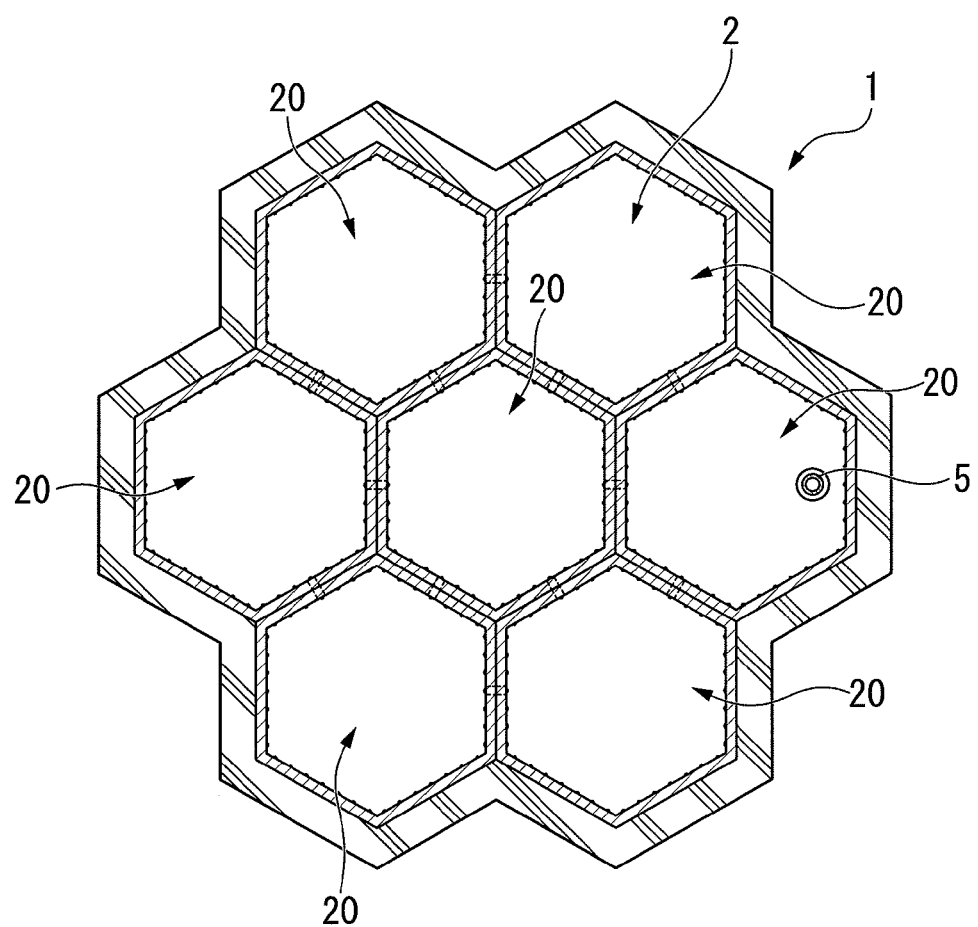
FIG. 4 is a cross-sectional view showing a variant example of a low-temperature tank according to an embodiment of the present invention.

However, the present invention is not limited to this and, as is shown in FIG. 4, it is also possible to use unit tanks 20 that have a hexagonal shape when seen in plan view instead of the unit tanks 10.

These unit tanks 20 that have a hexagonal shape when seen in plan view can be expected to provide superior resistance to deformation from an external force. Because of this, by using the unit tanks 20 that have a hexagonal shape when seen in plan view, it is possible to prevent the unit tanks 20 being deformed during transporting or assembly.

Note that the shape of the unit tanks when seen in plan view is not limited to the above-described structures, and provided that the shape is one that allows a plurality of unit tanks to be easily connected together, any desired shape can be employed. For example, the shape of the unit tanks when seen in plan view may also be a polygonal shape other than a square shape or hexagonal shape.

Moreover, in the above-described embodiment, a structure is described in which all of the unit tanks 10 are assembled such that they are all horizontally level.

Figure 5A:
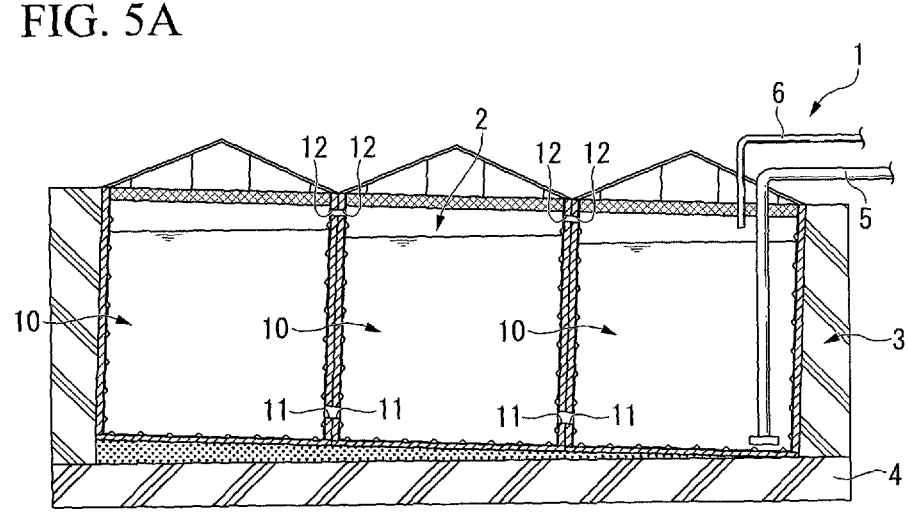
FIG. 5A is a cross-sectional view showing a variant example of a low-temperature tank according to an embodiment of the present invention.
Figure 5B:
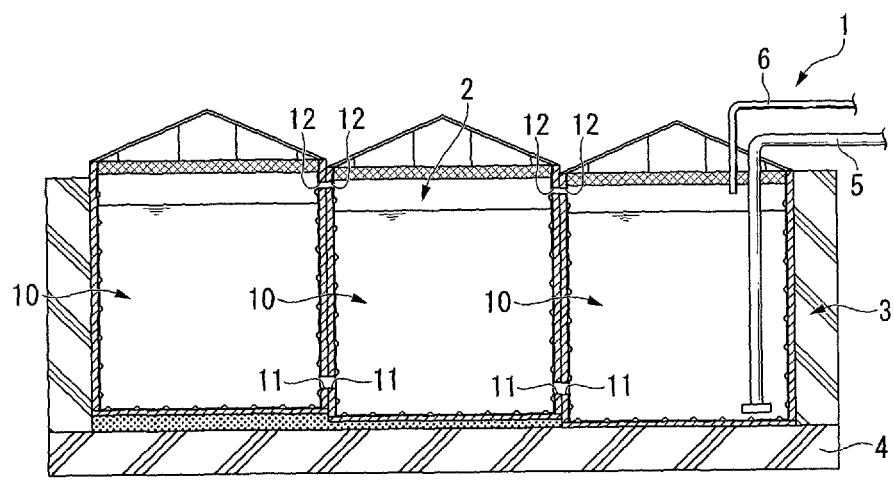
FIG. 5B is a cross-sectional view showing a variant example of a low-temperature tank according to an embodiment of the present invention.

However, the present invention is not limited to this and, as is shown in FIGS. 5A and 5B, it is also possible to employ a structure in which the unit tanks 10 are assembled such that the low-temperature liquefied gas extraction position in the inner tank 2 (i.e., the bottom surface of the unit tank 10 to which the pumping apparatus 5 is connected) is at the lowest position.

Note that as is shown in FIG. 5A, it is also possible to employ a structure in which the bottom surfaces of all of the unit tanks 10 are set on an inclination, and the lowest position of these bottom surfaces is set as the low-temperature liquefied gas extraction position. Alternatively, as is shown in FIG. 5B, it is also possible to employ a structure in which the bottom surfaces of mutually adjacent unit tanks 10 become gradually lower in a stepped arrangement, and low-temperature liquefied gas is extracted from the unit tank 10 having the lowest bottom surface.

Moreover, in the above-described embodiment, it is not necessary for the shape of the outer peripheral surface of the outer tank 3 to be circular. For example, it is also possible for the shape of the outer peripheral surface of the outer tank 3 to match the shape of the inner tank 2.

Furthermore, any desired pattern can be employed for the placement pattern of the inner tank 2. It is also possible for the inner tank 2 to be formed by connecting unit tanks together in a vertical direction.

INDUSTRIAL APPLICABILITY

According to the present invention, it is possible when constructing a low-temperature tank to shorten the construction time at the construction site.

DESCRIPTION OF THE REFERENCE NUMERALS

1 . . . Low-temperature tank, 2 . . . Inner tank, 3 . . . Outer tank, 10 . . . Unit tanks, 13 . . . Membrane, 14 . . . Thermal insulating material, 15 . . . Liner

The invention claimed is:

1. A method for constructing a low-temperature tank in which a low-temperature tank that stores Liquefied Natural Gas (LNG) is constructed on a previously determined construction site, comprising:
   a unit tank manufacturing step in which a plurality of unit tanks that are able to be connected to each other and that are each capable of storing LNG are manufactured at a factory that is distant from the construction site, the plurality of unit tanks constituting one inner tank;
   a transporting step in which the unit tanks are transported from the factory to the construction site;
   a foundation forming step in which a foundation is formed on the construction site;

an inner tank assembly step in which the one inner tank is assembled on the foundation at the construction site by connecting together the plurality of unit tanks;

an outer tank manufacturing step in which an outer tank is manufactured on the foundation around the one inner tank; and connecting a pumping apparatus to one unit tank from among the plurality of unit tanks, the pumping apparatus being configured to pump the LNG that has been stored in the inner tank to the outside of the inner tank and the outer tank, wherein the unit tanks are assembled in the inner tank assembly step such that heights of centers of bottom surfaces of the unit tanks decrease in a stepped arrangement and the unit tank having the lowest height of a center of a bottom surface is connected to the pumping apparatus.

2. The method for constructing a low-temperature tank according to claim 1, wherein wall portions of the unit tanks are provided with a metal membrane, thermal insulating material and a liner in sequence from the LNG storage area side of the unit tanks.

3. The method for constructing a low-temperature tank according to claim 2, wherein, in the outer tank manufacturing step, the outer tank, which is formed from concrete, is manufactured by pouring concrete around the unit tank.

4. The method for constructing a low-temperature tank according to claim 1, wherein the unit tanks are assembled in the inner tank assembly step such that a position in the one inner tank where the LNG is extracted is at the lowest position thereof.

5. The method for constructing a low-temperature tank according to claim 4, wherein bottom surfaces of the unit tanks that make up the one inner tank are inclined, and the lowest position of these bottom surfaces is set as the low-temperature liquefied gas extraction position.

6. The method for constructing a low-temperature tank according to claim 1, wherein, in the outer tank manufacturing step, the outer tank, which is formed from concrete, is manufactured by pouring concrete around the one inner tank.

7. The method for constructing a low-temperature tank according to claim 1, wherein the shape of the unit tanks when seen in plan view is hexagonal.

8. The method for constructing a low-temperature tank according to claim 1, wherein the plurality of unit tanks are joined together via holes for liquid that are open in a bottom portion of each unit tank and via holes for gas that are open in a top portion of each unit tank.

* * * * *